United States Patent
Igarashi et al.

(10) Patent No.: US 10,787,972 B2
(45) Date of Patent: Sep. 29, 2020

(54) CONTROLLER AND CONTROL METHOD FOR FORCED INDUCTION DEVICE

(71) Applicant: TOYOTA JIDOSHA KABUSHIKI KAISHA, Toyota-shi, Aichi-ken (JP)

(72) Inventors: Naoki Igarashi, Toyota (JP); Takato Hatano, Seto (JP); Hiroshi Kuma, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/517,215

(22) Filed: Jul. 19, 2019

(65) Prior Publication Data

US 2020/0088114 A1   Mar. 19, 2020

(30) Foreign Application Priority Data

Sep. 13, 2018   (JP) ................. 2018-171206

(51) Int. Cl.
*F02B 47/08* (2006.01)
*F02D 13/00* (2006.01)

(52) U.S. Cl.
CPC ........ *F02D 13/00* (2013.01); *F02D 2200/501* (2013.01)

(58) Field of Classification Search
CPC ........ F02M 26/00; F02M 26/05; F02M 26/06; F02M 26/07; F02B 37/18; F02D 41/042; F02D 41/065; F02N 11/0814

USPC ............. 123/568.11, 568.18, 568.21, 568.23
See application file for complete search history.

(56) References Cited

U.S. PATENT DOCUMENTS

| | | | |
|---|---|---|---|
| 2011/0072792 A1* | 3/2011 | Bidner | F02D 41/042 60/278 |
| 2014/0360179 A1* | 12/2014 | Doering | F02M 26/04 60/602 |
| 2017/0145891 A1* | 5/2017 | Kuma | F02B 37/24 |
| 2017/0218835 A1 | 8/2017 | Mito et al. | |
| 2018/0172120 A1* | 6/2018 | Kouno | H02K 11/215 |
| 2018/0191221 A1* | 7/2018 | Kouno | H02K 7/14 |
| 2018/0258841 A1* | 9/2018 | Iwata | F02M 26/67 |
| 2018/0259088 A1* | 9/2018 | Yamanaka | H02K 7/116 |
| 2018/0347485 A1* | 12/2018 | Dudar | F02D 41/008 |
| 2019/0162114 A1* | 5/2019 | Yoshizaki | F02B 37/186 |
| 2020/0122709 A1* | 4/2020 | Cunningham | F01N 13/107 |
| 2020/0173452 A1* | 6/2020 | Igarashi | F04D 29/24 |

FOREIGN PATENT DOCUMENTS

| | | |
|---|---|---|
| JP | 2014-227955 A | 12/2014 |
| JP | 2017-132360 A | 8/2017 |

* cited by examiner

*Primary Examiner* — John Kwon
(74) *Attorney, Agent, or Firm* — Oliff PLC (57) ABSTRACT

When there is a restart request to an engine, an electronic control unit controls a wastegate valve to a fully open position on condition that a speed of a vehicle is less than a threshold. When the vehicle speed is not less than the threshold, the electronic control unit restarts the engine and controls the wastegate valve in the closing direction until a desired torque is generated.

7 Claims, 4 Drawing Sheets

Engine Rotation Speed

Fig.4B

WGV Opening Degree

Fig.4C

Vehicle Speed

CONTROLLER AND CONTROL METHOD FOR FORCED INDUCTION DEVICE

BACKGROUND

1. Field

The present disclosure relates to a controller and control method for a forced-induction device.

2. Description of Related Art

Japanese Laid-Open Patent Publication No. 2017-132360 discloses a vehicle equipped with an engine and a motor generator as drive sources. The engine described in this document is provided with a forced-induction device that is rotationally driven by a turbine provided in the exhaust passage to compress intake air. The forced-induction device has a bypass passage that bypasses the turbine. The bypass passage includes a wastegate valve that selectively opens and closes the flow path of the bypass passage.

In the vehicle described in this document, the opening degree of the wastegate valve is controlled to a predetermined opening degree that is not the fully closed state in a traveling mode in which the vehicle is driven solely by the motor generator. When the vehicle is shifted from the traveling mode in which the vehicle is driven solely by the motor generator to a traveling mode in which the vehicle is driven by the engine, the opening degree of the wastegate valve is controlled to the fully closed state in accordance with the operating condition of the engine.

In the vehicle described in this document, the wastegate valve is controlled to be fully closed immediately after the engine is restarted. This increases the rotation speed of the turbine wheel in the forced-induction device. Therefore, depending on the operating condition of the engine, the sound generated as the turbine wheel rotates may be perceived as noise by occupants of the vehicle.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first general aspect, a controller for a forced-induction device is provided. The forced-induction device includes a turbine wheel arranged in an exhaust passage of an engine, a compressor wheel that is arranged in an intake passage of the engine and rotates integrally with the turbine wheel, a bypass passage that bypasses the turbine wheel, and a wastegate valve that selectively opens and closes a flow path of the bypass passage. The controller is configured to, when the engine is restarted after being stopped temporarily, perform a valve opening control to move the wastegate valve to a fully open position on condition that a speed of a vehicle is less than a threshold.

In a second general aspect, a controller for a forced-induction device is provided. The forced-induction device includes a turbine wheel arranged in an exhaust passage of an engine, a compressor wheel that is arranged in an intake passage of the engine and rotates integrally with the turbine wheel, a bypass passage that bypasses the turbine wheel, and a wastegate valve that selectively opens and closes a flow path of the bypass passage. The controller includes circuitry that is configured to, when the engine is restarted after being stopped temporarily, perform a valve opening control to move the wastegate valve to a fully open position on condition that a speed of a vehicle is less than a threshold.

In a third general aspect, a control method for a forced-induction device is provided. The forced-induction device includes a turbine wheel arranged in an exhaust passage of an engine, a compressor wheel that is arranged in an intake passage of the engine and rotates integrally with the turbine wheel, a bypass passage that bypasses the turbine wheel, and a wastegate valve that selectively opens and closes a flow path of the bypass passage. The method includes, when the engine is restarted after being stopped temporarily, performing a valve opening control to move the wastegate valve to a fully open position on condition that a speed of a vehicle is less than a threshold.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A controller for a forced-induction device according to an embodiment will now be described with reference to the drawings.

First, the schematic configuration of a hybrid system 100 of a hybrid vehicle will be described.

Figure 1:
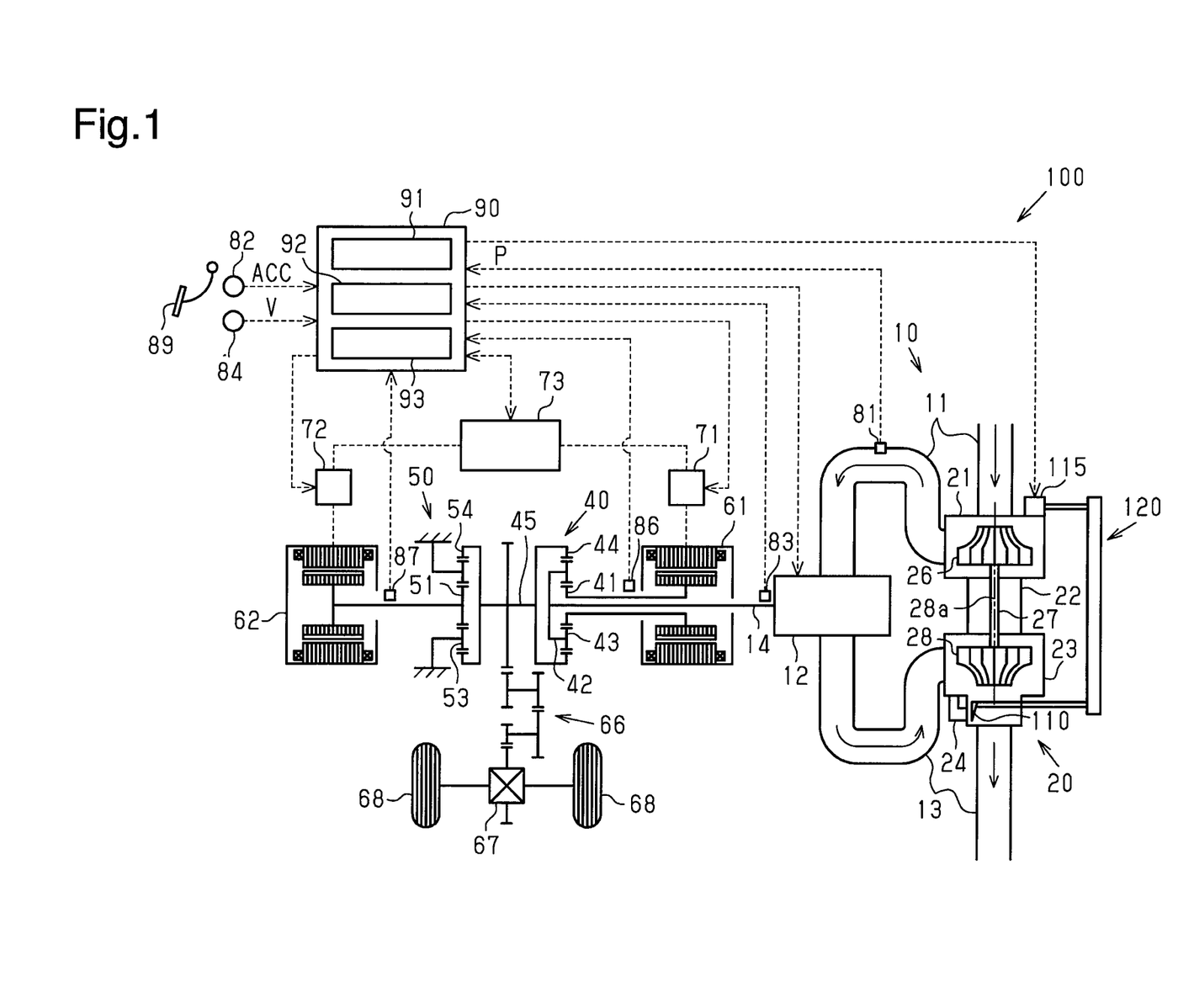
FIG. 1 is a schematic diagram of a hybrid system.

As shown in FIG. 1, the hybrid system 100 includes an engine 10, a driving force distribution-integration mechanism 40 connected to a crankshaft 14 of the engine 10, and a first motor generator 61 connected to the driving force distribution-integration mechanism 40. The driving force distribution-integration mechanism 40 is connected to a second motor generator 62 via a reduction gear 50. The driving force distribution-integration mechanism 40 is connected to driven wheels 68 via a speed reduction mechanism 66 and a differential 67.

The driving force distribution-integration mechanism 40 is a planetary gear mechanism and includes a sun gear 41, which is an external gear, and a ring gear 44, which is an internal gear coaxially arranged with the sun gear 41. Pinion gears 43 meshing with the sun gear 41 and the ring gear 44 are provided between the sun gear 41 and the ring gear 44. The pinion gears 43 are supported by a carrier 42 to be allowed to orbit and rotate. The sun gear 41 is coupled to the first motor generator 61. The carrier 42 is coupled to the crankshaft 14. The ring gear 44 is connected to a ring gear shaft 45. The ring gear shaft 45 is coupled to both the reduction gear 50 and the speed reduction mechanism 66.

When the output torque of the engine 10 is input to the carrier 42, the output torque is distributed to the sun gear 41 and the ring gear 44. That is, the output torque of the engine 10 is input to the first motor generator 61 to cause the first motor generator 61 to generate electricity.

In contrast, when the first motor generator 61 is caused to perform as an electric motor, the output torque of the first motor generator 61 is input to the sun gear 41. The output torque of the first motor generator 61 input to the sun gear 41 is distributed to the carrier 42 and the ring gear 44. Also, the output torque of the first motor generator 61 is input to the crankshaft 14 via the carrier 42 to rotate the crankshaft 14.

The reduction gear 50 is a planetary gear mechanism and includes a sun gear 51 and a ring gear 54. The sun gear 51 is an external gear coupled to the second motor generator 62. The ring gear 54 is an internal gear coaxially arranged with the sun gear 51. The ring gear 54 is connected to the ring gear shaft 45. Pinion gears 53 meshing with the sun gear 51 and the ring gear 54 are provided between the sun gear 51 and the ring gear 54. Each pinion gear 53 is rotational but is not allowed to orbit.

By causing the second motor generator 62 to perform as a generator when decelerating the vehicle, regenerative braking force is generated in the vehicle in accordance with the amount of electricity generated by the second motor generator 62. Also, when the second motor generator 62 is caused to perform as an electric motor, the output torque of the second motor generator 62 is input to the driven wheels 68 via the reduction gear 50, the ring gear shaft 45, the speed reduction mechanism 66, and the differential 67. This rotates the driven wheels 68, so that the vehicle travels.

The first motor generator 61 exchanges electricity with a battery 73 through a first inverter 71. The second motor generator 62 exchanges electricity with the battery 73 through a second inverter 72.

The engine 10 has an intake passage 11 configured to introduce intake air from the outside. The intake passage 11 is connected to a cylinder 12, which mixes fuel with the intake air and burns the mixture. The cylinder 12 incorporates a piston (not shown). The piston reciprocates in the cylinder 12 as fuel burns. The piston is coupled to the crankshaft 14. When fuel and intake air burn in the cylinder 12, the crankshaft 14 rotates. The cylinder 12 is connected to an exhaust passage 13 configured to discharge exhaust gas.

Next, a turbocharger 20 mounted on the engine 10 will be described.

As shown in FIG. 1, the engine 10 has a forced-induction device configured to compress intake air. The forced-induction device is the turbocharger 20 in the present embodiment. The turbocharger 20 has a compressor housing 21, which is installed in the middle of the intake passage 11. The turbocharger 20 also has a turbine housing 23, which is installed in the middle of the exhaust passage 13. The turbocharger 20 includes a bearing housing 22, which connects the compressor housing 21 and the turbine housing 23 to each other.

The turbine housing 23 accommodates a turbine wheel 28, which is rotated by flow of exhaust gas. The turbine wheel 28 has a rotation axis 28a and is rotational about the rotation axis 28a. The turbine wheel 28 is connected to one end of a shaft 27. The central portion of the shaft 27 is accommodated in the bearing housing 22. The shaft 27 is rotationally supported by a bearing (not shown). The rotation axis of the shaft 27 is coaxial with the rotation axis 28a of the turbine wheel 28. The other end of the shaft 27 is connected to a compressor wheel 26. The rotation axis of the compressor wheel 26 is coaxial with the rotation axis 28a of the turbine wheel 28. The compressor wheel 26 rotates integrally with the turbine wheel 28 to compress intake air and supplies it to the cylinder 12.

The turbine housing 23 has a bypass passage 24, which connects the upstream side and the downstream side of the turbine wheel 28 to each other. That is, the bypass passage 24 bypasses the turbine wheel 28.

Further, a wastegate valve 110, an electric motor 115, and a coupling mechanism 120 are attached to the turbocharger 20. The electric motor 115 performs as an actuating portion that actuates the wastegate valve 110. The coupling mechanism 120 couples the wastegate valve 110 and the electric motor 115 to each other.

Figure 2:
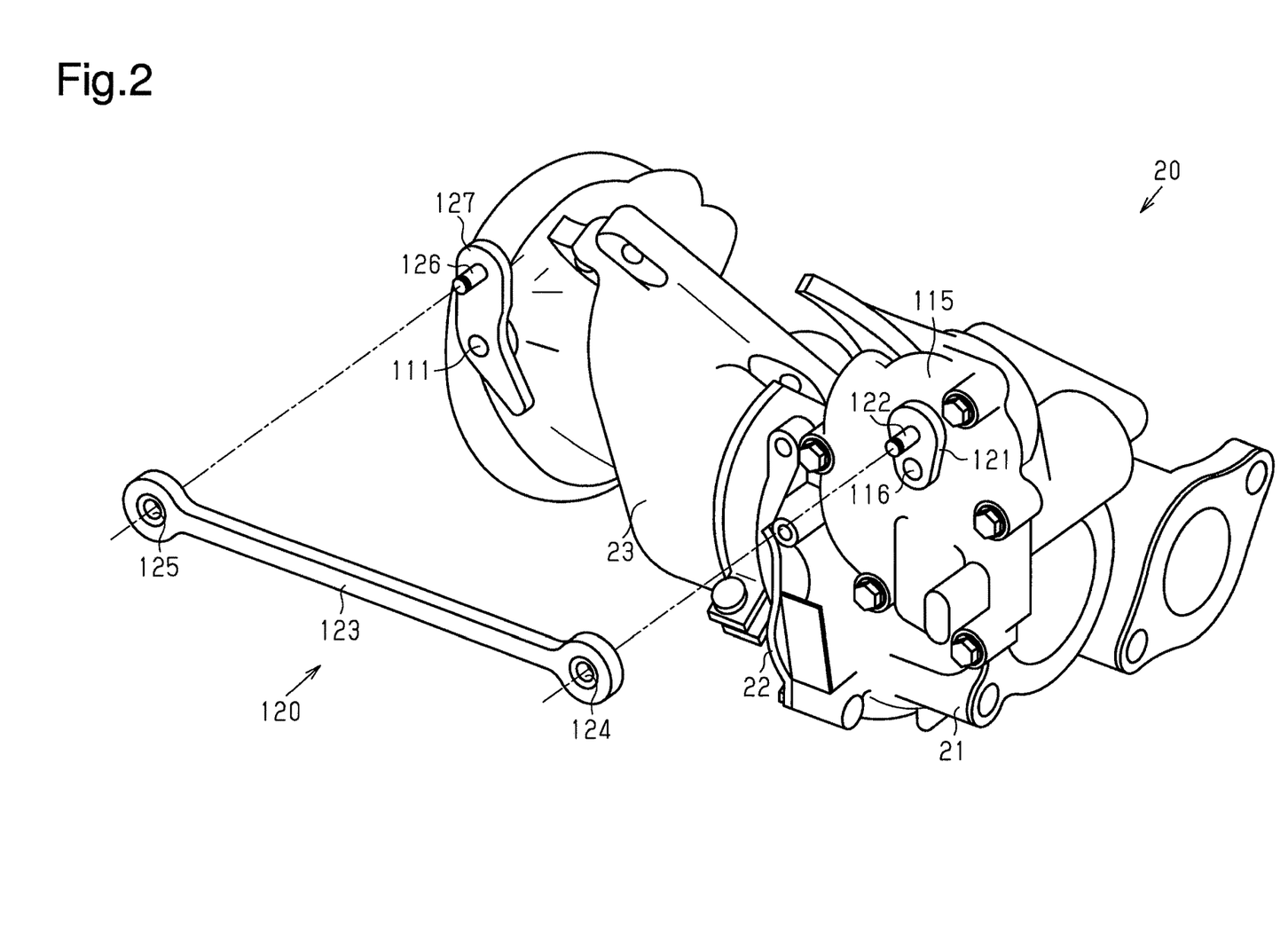
FIG. 2 is a perspective view of the turbocharger.

As shown in FIG. 2, the electric motor 115 is attached to the outer wall surface of the compressor housing 21. The electric motor 115 includes an output shaft 116, to which a first link arm 121 is fixed. The first link arm 121 extends in the radial direction of the output shaft 116. One end in the longitudinal direction of the first link arm 121 is fixed to the output shaft 116. The first link arm 121 is integrally rotational with the output shaft 116.

A substantially columnar first coupling pin 122 protrudes from the other end in the longitudinal direction of the first link arm 121, that is, the end of the first link arm 121 opposite to the output shaft 116. An actuation rod 123, which is shaped like a bar as a whole, is connected to the first coupling pin 122. A substantially cylindrical first coupling hole 124 is formed at one end in the longitudinal direction of the actuation rod 123. The actuation rod 123 is rotationally coupled to the first link arm 121 by inserting the first coupling pin 122 into the first coupling hole 124.

A substantially cylindrical second coupling hole 125 is formed at the other end in the longitudinal direction of the actuation rod 123, that is, at the end of the actuation rod 123 opposite to the first coupling hole 124. A substantially columnar second coupling pin 126 is inserted into the second coupling hole 125.

The second coupling pin 126 is fixed to a second link arm 127 at the end opposite to the end inserted into the second coupling hole 125. The second link arm 127 is elongated, slightly curved, and has an arcuate shape as a whole. The second coupling pin 126 is fixed to one end in the longitudinal direction of the second link arm 127. A rotary shaft 111 of the wastegate valve 110 is fixed to the approximate center in the longitudinal direction of the second link arm 127.

Although not shown, a part of the rotary shaft 111 opposite to the second link arm 127 protrudes into the turbine housing 23. Also, a valve member of the wastegate valve 110 is fixed to the part of the rotary shaft 111 that protrudes into the turbine housing 23. When the rotary shaft 111 rotates in a first direction, the wastegate valve 110 is actuated to close the bypass passage 24. When the rotary shaft 111 rotates in a direction opposite to the first direction, the wastegate valve 110 is actuated to open the bypass passage 24.

That is, electric motor 115 is coupled to the wastegate valve 110 by the coupling mechanism 120. Then, when the electric motor 115 rotates the rotary shaft 111 in the first direction, the wastegate valve 110 is actuated in the closing direction. Also, when the electric motor 115 rotates the rotary shaft 111 in a direction opposite to the first direction, the wastegate valve 110 is actuated in the opening direction.

The position at which the wastegate valve 110 fully closes the bypass passage 24 (opening degree: 0%) will be referred to as a fully closed position. The position at which the wastegate valve 110 fully opens the bypass passage 24 (opening degree: 100%) will be referred to as fully open position.

The electrical configuration of the hybrid system 100 will now be described.

As shown in FIG. 1, the hybrid system 100 includes an electronic control unit 90 that controls, in a centralized manner, the hybrid system 100.

The electronic control unit 90 includes, as control units, a battery monitoring section 91, a drive controller 92, and a forced-induction controller 93. The battery monitoring section 91 monitors the state of charge of the battery 73. The drive controller 92 controls the engine 10, the first motor generator 61, and the second motor generator 62. The forced-induction controller 93 performs as a controller that controls the turbocharger 20, which performs as a forced-induction device.

The electronic control unit 90 receives signals from various sensors of the hybrid system 100. The electronic control unit 90 receives a detection signal indicating a boost pressure P from a boost pressure sensor 81. The boost pressure sensor 81 is attached to a section of the intake passage 11 on the downstream side of the compressor housing 21. The boost pressure sensor 81 detects, as the boost pressure P, the pressure in a section of the intake passage 11 on the downstream side of the compressor housing 21.

The electronic control unit 90 receives a signal indicating the rotational angle of the crankshaft 14 from a crank angle sensor 83. The crank angle sensor 83 is provided in the vicinity of the crankshaft 14. The crank angle sensor 83 detects the rotational position of the crankshaft 14 in relation to a reference position.

The electronic control unit 90 receives a signal that indicates the state of the battery 73 from the battery 73. The state of the battery 73 includes the current, voltage, and temperature of the battery 73. The electronic control unit 90 receives detection signals from a first rotation sensor 86 and a second rotation sensor 87. The first rotation sensor 86 is provided in the vicinity of the first motor generator 61 to detect the rotation speed of the first motor generator 61 (sun gear 41). Likewise, the second rotation sensor 87 is provided in the vicinity of the second motor generator 62 to detect the rotation speed of the second motor generator 62 (sun gear 51).

The electronic control unit 90 receives signal indicating an accelerator operation amount ACC from an accelerator operation amount sensor 82. The acceleration operation amount ACC indicates the operation amount of an accelerator pedal 89 by the driver. The electronic control unit 90 also receives a signal indicating a vehicle speed V from a vehicle speed sensor 84.

The battery monitoring section 91 calculates the state of charge of the battery 73 based on signals from the battery 73 (current, voltage, and temperature). The battery monitoring section 91 calculates, as the state of charge, the current charged electric charge amount in relation to the fully charged electric charge amount.

The drive controller 92 calculates the rotation speed and the rotation torque of the first motor generator 61 based on a detection signal from the first rotation sensor 86 and the charged/discharged amount of the first motor generator 61. Likewise, the drive controller 92 calculates the rotation speed and the rotation torque of the second motor generator 62 based on a detection signal from the second rotation sensor 87 and the charged/discharged amount of the second motor generator 62.

The drive controller 92 calculates the engine rotation speed based on a detection signal from the crank angle sensor 83. Specifically, the drive controller 92 calculates the engine rotation speed based on the amount of change of the rotational position of the crankshaft 14 per unit time.

Based on the accelerator operation amount ACC and the vehicle speed V, the drive controller 92 calculates a required torque to be output from the driving force distribution-integration mechanism 40 to the speed reduction mechanism 66. The drive controller 92 controls the engine 10, the first motor generator 61, and the second motor generator 62 such that a required power corresponding to the required torque is output to the speed reduction mechanism 66.

The forced-induction controller 93 controls the opening degree of the wastegate valve 110 based on a detection signal indicating the boost pressure P from the boost pressure sensor 81, a detection signal indicating the accelerator operation amount ACCP from the accelerator operation amount sensor 82, and a detection signal indicating the vehicle speed V from the vehicle speed sensor 84. The forced-induction controller 93 basically controls the electric motor 115 such that the wastegate valve 110 closes, for example, during acceleration, when the required power of the engine 10 is great. This reduces the opening degree of the bypass passage 24, increasing the rotation speed of the turbine wheel 28. As a result, the rotation speed of the compressor wheel 26 increases, and the amount of intake air pumped to the cylinder 12 increases.

The control of the engine 10, the first motor generator 61, and the second motor generator 62 by the drive controller 92 will now be described.

The drive controller 92 sets a target rotation speed and a target engine torque based on the required torque. The drive controller 92 controls the engine 10 such that the engine rotation speed and the engine torque become the target rotation speed and the target engine torque, respectively. The target rotation speed and the target engine torque are set in the following manner. That is, based on the accelerator operation amount ACC and the vehicle speed V, the drive controller 92 sets a required traveling power of the engine 10 and the required torque to be output to the speed reduction mechanism 66 as the driving torque required for the vehicle. The drive controller 92 calculates a required charging/discharging power from the battery 73 to the engine 10 based on the storage amount of the battery 73 calculated by the battery monitoring section 91. Subsequently, the drive controller 92 calculates the total required power of the engine 10 as the sum of the required traveling power based on the accelerator operation amount ACC and the vehicle speed V and the required charging/discharging power of the battery 73. Also, the drive controller 92 determines the target rotation speed and the target engine torque of the engine 10 by applying the total required power to an optimal fuel economy map stored in the electronic control unit 90.

The drive controller 92 performs feedback control of the electricity generation torque of the first motor generator 61 such that the engine rotation speed becomes the target rotation speed. The drive controller 92 determines the target motor torque of the second motor generator 62 such that the second motor generator 62 generates torque compensating for the torque shortage that is calculated by subtracting the electricity generating torque of the first motor generator 61 from the previously set required torque to be output to the speed reduction mechanism 66. The drive controller 92 controls the second motor generator 62 based on the determined target motor torque.

As described above, the first motor generator 61 is driven by using some of the driving force from the engine 10, and the second motor generator 62 is driven by using the electricity generated by the first motor generator 61. As a result, the driving force from the engine 10 and the driving force from the second motor generator 62 are transmitted to the driven wheels 68. Thus, some of the driving force from the engine 10 is distributed to the first motor generator 61, and the driving force from the second motor generator 62 assists the driving of the driven wheels 68. The required power is gained while operating the engine 10 in the efficient operational region while adjusting the engine rotation speed.

The drive controller 92 supplies electricity from the battery 73 to the second motor generator 62 during acceleration, when the total required power is great, to increase the assist amount by the second motor generator 62, so that a greater driving force is delivered to the speed reduction mechanism 66.

Furthermore, based on the state of charge of the battery 73 calculated by the battery monitoring section 91, the drive controller 92 increases the amount of driving of the engine 10 when the state of charge of the battery 73 is low, thereby increasing the amount of electricity generated by the first motor generator 61. The electricity is thus supplied to the battery 73. When the state of charge of the battery 73 is sufficient, the drive controller 92 is allowed to stop the engine 10 and cause only the second motor generator 62 to deliver the driving force meeting the required power to the speed reduction mechanism 66.

That is, when the state of charge of the battery 73 is low, the drive controller 92 causes the vehicle to travel in a hybrid traveling mode (hereinafter, simply referred to as HV mode), in which at least the engine 10 is used as a drive source. The HV mode includes a case in which the driven wheels 68 are driven by operating the engine 10 and the second motor generator 62, which is an electric motor, and a case in which the driven wheels 68 are driven only by operating the engine 10. That is, the HV mode is a traveling mode of the vehicle when the engine 10 is operating.

In some cases, the state of charge of the battery 73 is sufficient and the driving force that meets the required power can be gained solely from the second motor generator 62 when the vehicle is traveling in the HV mode. In such a case, the drive controller 92 causes the vehicle to travel in an electric vehicle mode (hereinafter, simply referred to as EV mode), in which only the second motor generator 62 is used as the drive source. In the EV mode, the operation of the engine 10 is stopped, and the driven wheels 68 are driven solely by the second motor generator 62. The situations in which the vehicle travels in the EV mode include, for example, a case in which the vehicle is traveling downhill or at a relatively low speed.

When switching from the HV mode to the EV mode takes place, the operation of the engine 10 is automatically stopped. The automatic stopping of the engine 10 when switching from the HV mode to the EV mode takes place is referred to as a temporary stop of the engine 10. At the temporary stop of the engine 10, the hybrid system 100 is operating although the engine 10 is stopped.

When traveling in the EV mode, the vehicle may be switched to the HV mode if the state of charge of the battery 73 is reduced and the engine 10 is operated in order to charge the battery 73. Such switching can occur when the state of charge of the battery 73 becomes low after the vehicle has traveled for a relatively long time, or when the state of charge to be secured by the battery 73 to operate electric auxiliary devices is increased. When switching from the EV mode to the HV mode takes place, the engine 10 is automatically started. The automatic start of the engine 10 when switching from the EV mode to the HV mode takes place is referred to as restart of the engine 10. At the restart of the engine 10, the engine 10 is started without operating the engine start switch such as the ignition switch or the system start switch.

Figure 3:
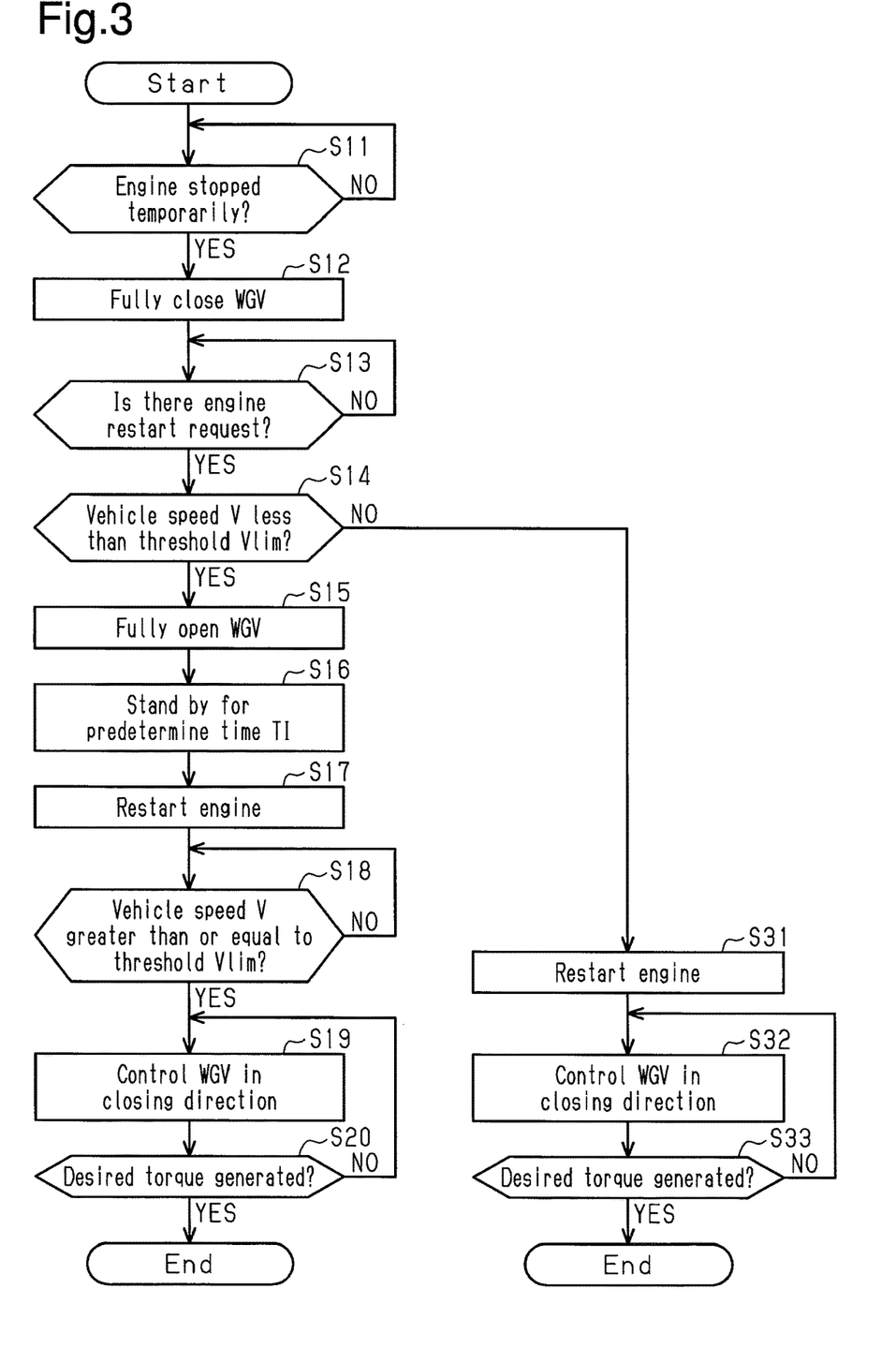
FIG. 3 is a flowchart showing an opening-closing process of the wastegate valve.

Next, the process of the opening-closing control of the wastegate valve 110 performed by the forced-induction controller 93, in particular, the opening-closing control process associated with the temporary stop of the engine 10 will be described. When a signal indicating a temporary stop request to the engine 10 is output from the drive controller 92 in response to switching from the HV mode to the EV mode, the forced-induction controller 93 starts the process of the opening-closing control of the wastegate valve 110.

As shown in FIG. 3, the forced-induction controller 93 determines whether the engine 10 has been stopped temporarily in step S11. Specifically, if the engine rotation speed calculated based on the signal from the crank angle sensor 83 becomes zero, the forced-induction controller 93 determines that the engine 10 has been stopped. If the engine 10 has not been stopped (S11: NO), the forced-induction controller 93 repeats step S11. If the engine 10 has been stopped (S11: YES), the forced-induction controller 93 advances the process to step S12.

In step S12, the forced-induction controller 93 controls the wastegate valve 110 to be fully closed at the fully closed position. Specifically, the forced-induction controller 93 rotates the output shaft 116 of the electric motor 115 such that the wastegate valve 110 rotates in the direction of completely closing the bypass passage 24. At this time, if the position of the wastegate valve 110 is within a certain range including the fully closed position, the forced-induction controller 93 gradually reduces the rotation speed of the output shaft 116 of the electric motor 115 as the position of the wastegate valve 110 approaches the fully closed position. The certain range including the fully closed position is the range of 0% to 20% of the opening degree of the wastegate valve 110. When the the position of the wastegate valve 110 reaches the fully closed position, the forced-induction controller 93 maintains the wastegate valve 110 at the fully closed position. The forced-induction controller 93 supplies electricity to the electric motor 115 even after the wastegate valve 110 reaches the fully closed position. As a result, the wastegate valve 110 is pressed against the opening of the bypass passage 24, so that the fully closed position is maintained against the pressure of the exhaust gas in the bypass passage 24. Thereafter, the forced-induction controller 93 advances the process to step S13.

In step S13, the forced-induction controller 93 determines whether there is a restart request to the engine 10. Specifically, if the drive controller 92 outputs a restart request to the engine 10 when switching from the EV mode to the HV mode takes place, the forced-induction controller 93 determines that there is a restart request to the engine 10. If there is no restart request to the engine 10 (S13: NO), the forced-induction controller 93 repeats step S13. If there is a restart request to the engine 10 (S13: YES), the forced-induction controller 93 advances the process to step S14.

In step S14, the forced-induction controller 93 determines whether the vehicle speed V is less than a threshold Vlim. Specifically, if the vehicle speed V, which is delivered from the vehicle speed sensor 84 to the electronic control unit 90, is less than the predetermined threshold Vlim, the forced-induction controller 93 determines that the vehicle speed V is less than the threshold Vlim. The threshold Vlim is, for example, 10 km/h. If the vehicle speed V is less than the threshold Vlim (S14: YES), the forced-induction controller 93 advances the process to step S15.

In step S15, the forced-induction controller 93 starts controlling the wastegate valve 110 to be fully open at the fully open position. Specifically, the forced-induction controller 93 rotates the output shaft 116 of the electric motor 115 such that the wastegate valve 110 rotates in the direction of completely opening the bypass passage 24. Thereafter, the forced-induction controller 93 advances the process to step S16.

In step S16, the forced-induction controller 93 stands by for a predetermined time TI. The predetermined time TI is set to be longer than the time required to actuate the wastegate valve 110 from the fully closed position to the fully open position, and is for example, several hundred milliseconds to several seconds. Thereafter, the forced-induction controller 93 advances the process to step S17.

In step S17, the forced-induction controller 93 causes the drive controller 92 to restart the engine 10. As described above, at least the predetermined time TI has elapsed from the restart request to the engine 10 in step S13 to step S17. Therefore, the wastegate valve 110 starts being opened in response to the restart request to the engine 10, and is opened to the fully open position before the engine 10 is restarted. Thereafter, the forced-induction controller 93 advances the process to step S18.

In step S18, the forced-induction controller 93 determines whether the vehicle speed V is greater than or equal to the threshold Vlim. Specifically, if the vehicle speed V, which is delivered from the vehicle speed sensor 84 to the electronic control unit 90, is greater than or equal to the predetermined threshold Vlim, the forced-induction controller 93 determines that the vehicle speed V is greater than or equal to the threshold Vlim. If the vehicle speed V is less than the threshold Vlim (S18: NO), the forced-induction controller 93 repeats step S18. If the vehicle speed V is greater than or equal to the threshold Vlim (S18: YES), the forced-induction controller 93 advances the process to step S19.

In step S19, the forced-induction controller 93 controls the wastegate valve 110 in the closing direction. Specifically, the forced-induction controller 93 actuates the wastegate valve 110 in the closing direction by a predetermined opening degree. Thereafter, the forced-induction controller 93 advances the process to step S20.

In step S20, the forced-induction controller 93 determines whether a desired torque is being generated. Specifically, the forced-induction controller 93 determines whether the torque that is calculated based on the signal delivered from the crank angle sensor 83 or the like to the electronic control unit 90 is greater than or equal to the desired torque determined by the vehicle speed V, the accelerator operation amount ACC, and the like. If the desired torque is not being generated (S20: NO), the forced-induction controller 93 returns the process to step S19. In this case, the forced-induction controller 93 controls the wastegate valve 110 in the closing direction until the desired torque is generated. If the desired torque is being generated (S20: YES), the forced-induction controller 93 stops the current process of the opening-closing control of the wastegate valve 110.

If the vehicle speed V is greater than or equal to the threshold Vlim (S14: NO), the forced-induction controller 93 advances the process to step S31. In step S31, the forced-induction controller 93 causes the drive controller 92 to restart the engine 10. Thereafter, the forced-induction controller 93 advances the process to step S32.

In step S32, the forced-induction controller 93 controls the wastegate valve 110 in the closing direction. Specifically, the forced-induction controller 93 actuates the wastegate valve 110 in the closing direction by a predetermined opening degree. Thereafter, the forced-induction controller 93 advances the process to step S33.

In step S33, the forced-induction controller 93 determines whether the desired torque is being generated. Specifically, the forced-induction controller 93 determines whether the torque that is calculated based on the signal delivered from the crank angle sensor 83 or the like to the electronic control unit 90 is greater than or equal to the desired torque determined by the vehicle speed V, the accelerator operation amount ACC, and the like. If the desired torque is not being generated (S33: NO), the forced-induction controller 93 returns the process to step S32. In this case, the forced-induction controller 93 controls the wastegate valve 110 in the closing direction until the desired torque is generated. If the desired torque is being generated (S33: YES), the forced-induction controller 93 stops the current process of the opening-closing control of the wastegate valve 110. After the above-described series of processes is ended, the forced-induction controller 93 controls the opening degree of the wastegate valve 110 based on a detection signal indicating the accelerator operation amount ACCP from the accelerator operation amount sensor 82 and a detection signal indicating the vehicle speed V from the vehicle speed sensor 84.

The operation and advantages of the electronic control unit 90 will now be described.

Figure 4A:
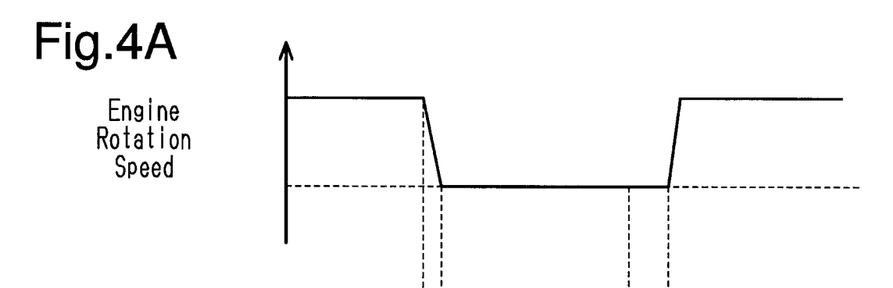
FIG. 4A is a timing diagram showing changes in the engine rotation speed.

As shown in FIG. 4A, a signal indicating a temporary stop request to the engine 10 is input at a point in time t1. Accordingly, fuel supply to the engine 10 is stopped, and the engine rotation speed starts to decrease.

Figure 4B:
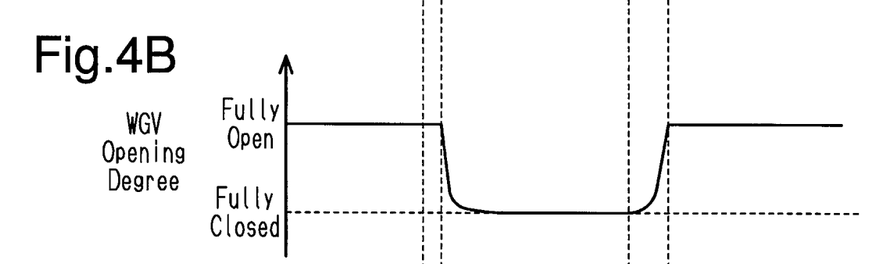
FIG. 4B is a flowchart showing changes in the opening degree of the wastegate valve.

Thereafter, the engine rotation speed becomes zero at a point in time t2. Then, as shown in FIG. 4B, valve closing control to the fully closed position of the wastegate valve 110 is started. That is, on condition that the engine 10 is stopped temporarily, the valve closing control to the fully closed position of the wastegate valve 110 is started. In other words, the valve closing control to the fully closed position of the wastegate valve 110 is not started until the engine 10 is stopped temporarily. Therefore, when the engine 10 is operating, the rotation speed of the turbine wheel 28 does not increase since the wastegate valve 110 is not controlled to the fully closed position. This suppresses the noise generated by rotation of the turbine wheel 28 before and after the engine 10 is stopped temporarily.

As shown in FIG. 4B, the valve closing control to the fully closed position of the wastegate valve 110 is started at the point in time t2. The opening degree of the wastegate valve 110 gradually approaches the fully closed position. In the range of 0% to 20% of the opening degree of the wastegate valve 110, the closing speed of the wastegate valve 110 decreases as the wastegate valve 110 approaches the fully closed position. This reduces the momentum of the wastegate valve 110 when it collides with the opening of the bypass passage 24. Accordingly, the collision sound is reduced when the wastegate valve 110 reaches the fully closed position.

In the EV mode in which engine 10 is stopped temporarily, the operation of the engine 10 is stopped. Thus, as compared with the HV mode, the passenger compartment is quiet since the operational sound of the engine 10 is not generated. Therefore, even a slight sound may be perceived as noise by the passenger.

In this respect, in the above-described embodiment, the wastegate valve 110 is pressed against the opening of the bypass passage 24 and is maintained in the fully closed position from when the wastegate valve 110 reaches the fully closed position until the wastegate valve 110 is controlled to the open side. The wastegate valve 110 is maintained at the fully closed position until the wastegate valve 110 is opened in response to a restart request to the engine 10 after the wastegate valve 110 is move to the fully closed position through the valve closing control on condition that the engine 10 is stopped temporarily. When the engine 10 is stopped temporarily, force is applied to the wastegate valve 110 and the second link arm 127 of the coupling mechanism 120. Also, force is applied to the second coupling pin 126 and the actuation rod 123, which constitute the coupling mechanism 120. Furthermore, force is also applied to the first coupling pin 122 and the actuation rod 123, which constitute the coupling mechanism 120. As a result, even under a situation where the engine 10 is stopped temporarily and there is no operational sound of the engine 10, contact sound between the wastegate valve 110 and the coupling mechanism 120 and contact sound between components constituting the coupling mechanism 120 are unlikely to occur.

Figure 4C:
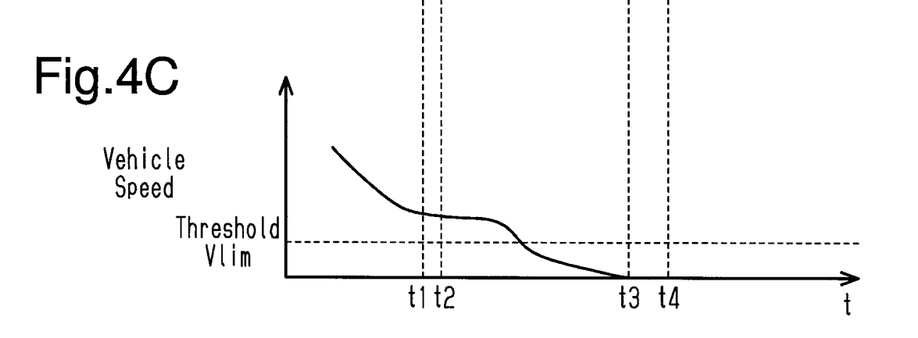
FIG. 4C is a timing diagram showing changes in the vehicle speed.

As shown in FIG. 4C, it is assumed that the vehicle speed V is less than the threshold Vlim when a restart request to the engine 10 is made at a point in time t3 after the wastegate valve 110 is controlled to the fully closed position. In this case, the control to the fully closed position of the wastegate valve 110 is started as shown in FIG. 4B. Such an increase in the opening degree of the wastegate valve 110 limits rotation of the turbine wheel 28 when the engine 10 is restarted. Therefore, even if the vehicle speed V is less than the threshold Vlim and the vehicle is relatively quiet, the sound generated by rotation of the turbine wheel 28 is unlikely to be perceived as noise by occupants of the vehicle.

Particularly, at a point in time t3, the valve opening control to the fully open position of the wastegate valve 110 is started in response to a restart request to the engine 10. After the wastegate valve 110 reaches the fully open position at a point in time t4, when the predetermined time TI has elapsed since the point in time t3, the engine 10 is restarted. As such, the wastegate valve 110 has already reached the fully open position at the timing when the engine 10 is restarted. Therefore, at the timing when the engine 10 is restarted, most of the exhaust gas flows to the bypass passage 24, so that the rotation speed of the turbine wheel 28 is kept significantly low. This makes it more difficult for the occupants of the vehicle to perceive the sound generated as the turbine wheel 28 rotates.

The above-described embodiment may be modified as follows. The present embodiment and the following modifications can be combined as long as the combined modifications remain technically consistent with each other.

The wastegate valve 110 does not necessarily need to be at the fully open position at the start of restart of the engine 10 (point in time t4 in FIG. 4). For example, the control of the wastegate valve 110 to the fully open position may be started simultaneously with restart of the engine 10. Also in this case, the rotation of the turbine wheel 28 is limited as compared with a case in which the wastegate valve 110 is at the fully closed position after the engine 10 is restarted.

The wastegate valve 110 does not necessarily need to be maintained at the fully closed position until a restart request to the engine 10 is made after the wastegate valve 110 is move to the fully closed position through the valve closing control on condition that the engine 10 is stopped temporarily. In other words, the electricity supply to the electric motor 115 may be stopped while the engine 10 is stopped temporarily. For example, the pressure of the exhaust gas in the bypass passage 24 actuates the wastegate valve 110 in the opening direction in some cases. In such a case, it is only necessary to start supplying electricity to the electric motor 115 again when the wastegate valve 110 is actuated in the opening direction, thereby actuating the wastegate valve 110 in the closing direction.

Even when supply of electricity to the electric motor 115 is stopped, the wastegate valve 110 is maintained at the fully closed position in some cases. The initial torque for actuating the wastegate valve 110 is great when the friction between the actuation rod 123 and the first coupling pin 122 or the friction between the actuation rod 123 and the second coupling pin 126 is great, or when the dynamic resistance inside the electric motor 115 is great. If the initial torque is greater than the torque of the exhaust gas in the bypass passage 24 acting to actuate the wastegate valve 110 in the opening direction, the wastegate valve 110 is maintained at the fully closed position. In this manner, if the wastegate valve 110 is moved to the fully closed position against the pressure of the exhaust gas in the bypass passage 24, the wastegate valve 110 is maintained at the fully closed position regardless whether electricity is supplied to the electric motor 115.

The speed at which the wastegate valve 110 is closed does not necessarily need to be decreased as it approaches the fully closed position when the wastegate valve 110 is moved to the fully closed position through the valve closing control on condition that the engine 10 is stopped temporarily. The closing speed of the wastegate valve 110 may be constant in the range of the opening degree between 0% and 100%. In this case, if the closing speed of the wastegate valve 110 is relatively slow, the collision sound between the wastegate valve 110 and the opening of the bypass passage 24 is suppressed.

When the valve closing control of the wastegate valve 110 is performed on condition that the engine 10 is stopped temporarily, the wastegate valve 110 does not need to be controlled to be at the fully closed position. For example, it is only necessary to control the wastegate valve 110 to a position where the wastegate valve 110 is more closed than the fully open position. In this case, when the engine 10 is restarted, the wastegate valve 110 is moved to the fully open position through the valve opening control. Thus, the sound generated by rotation of the turbine wheel 28 at least when the engine 10 is restarted is less likely to be perceived as noise by the vehicle occupants than in the case in which the wastegate valve 110 is not moved to the fully open position through the valve opening control.

When moving the wastegate valve 110 to the fully closed position through the valve closing control on condition that the engine 10 is stopped temporarily from an operating state, the timing at which the valve closing control to the fully closed position is not limited to that in the above-described embodiment. For example, the valve closing control of the wastegate valve 110 to the fully closed position may be started at the same time as the signal indicating a request for temporarily stopping the engine 10 is output. In this case, the opening degree of the wastegate valve 110 starts to decrease before the engine 10 is stopped temporarily.

The opening-closing control process of the wastegate valve 110 in response to temporary stop of the engine 10 in the above-described embodiment is not limited to the one that is implemented when switching between the EV mode and the HV mode takes place. For example, some vehicles are configured to perform idle reduction by temporarily stopping the engine 10 when the accelerator pedal 89 is not depressed and the vehicle speed V is less than or equal to a predetermined speed. The opening-closing control process of the wastegate valve 110 may be executed when the engine 10 is restarted from such idle reduction.

The threshold Vlim of step S14 may be different from the threshold Vlim of step S18. For example, the threshold Vlim of step S18 may be greater than the threshold Vlim of step S14. In this case, the control of the wastegate valve 110 in the closing direction can be started only when the vehicle speed V is relatively high and the required torque of the engine 10 is great, that is, when the wastegate valve 110 needs to be controlled in the closing direction.

Instead of standing by for the predetermined time TI in step S16, the engine 10 may be restarted after the opening degree of the wastegate valve 110 is detected by a sensor, and it is detected that the wastegate valve 110 has reached the fully open position.

The hybrid system 100 is not limited to the one in the above-described embodiment. For example, the present disclosure may be employed for a hybrid system that includes one motor generator that performs as a generator and an electric motor. If the opening-closing control process of the wastegate valve 110 is implemented in association with idle reduction as in the above-described modification, a drive system having only the engine 10 as a drive source may be used.

The actuating portion for actuating the wastegate valve 110 does not necessarily need to be the electric motor 115. In this case, the actuating portion may be changed to any type of actuator that perform the valve opening control of the wastegate valve 110 via the coupling mechanism 120. Examples of such actuators include a vacuum actuator.

The configuration of the coupling mechanism 120 may be changed as necessary. The coupling mechanism 120 simply needs to be composed of multiple parts including at least the wastegate valve 110.

The controller 90 is not limited to one that performs software processing on all processes executed by itself. For example, the controller 90 may include a dedicated hardware circuit (such as an ASIC) that executes at least part of the software processing executed in each of the above-described embodiments. That is, the controller 90 may be modified as long as it has any one of the following configurations (a) to (c). (a) A configuration including a processor that executes all of the above-described processes according to programs and a program storage device such as a memory that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for a forced-induction device, wherein the forced-induction device includes
    a turbine wheel arranged in an exhaust passage of an engine,
    a compressor wheel that is arranged in an intake passage of the engine and rotates integrally with the turbine wheel,
    a bypass passage that bypasses the turbine wheel, and
    a wastegate valve that selectively opens and closes a flow path of the bypass passage, and
    the controller is configured to, when the engine is restarted after being stopped temporarily, perform a valve opening control to move the wastegate valve to a fully open position on condition that a speed of a vehicle is less than a threshold.

2. The controller for a forced-induction device according to claim 1, the controller being configured to
    start the valve opening control of the wastegate valve in response to a restart request to the engine, and
    open the wastegate valve to the fully open position before the engine is restarted.

3. The controller for a forced-induction device according to claim 1, the controller being configured to start a valve closing control to move the wastegate valve to a fully closed position on condition that the engine is stopped temporarily from an operating state.

4. The controller for a forced-induction device according to claim 3, the controller being configured to, when performing the valve closing control to move the wastegate valve to the fully closed position, reduce a closing speed of the wastegate valve as the wastegate valve approaches the fully closed position in a case in which the position of the wastegate valve is in a certain range on a closing side that includes the fully closed position.

5. The controller for a forced-induction device according to claim 3, the controller being configured to maintain the wastegate valve at the fully closed position until the restart request to the engine is made after performing the valve closing control to move the wastegate valve to the fully closed position on condition that the engine is stopped temporarily.

6. A controller for a forced-induction device, wherein
the forced-induction device includes
- a turbine wheel arranged in an exhaust passage of an engine,
- a compressor wheel that is arranged in an intake passage of the engine and rotates integrally with the turbine wheel,
- a bypass passage that bypasses the turbine wheel, and
- a wastegate valve that selectively opens and closes a flow path of the bypass passage, and the controller includes circuitry that is configured to, when the engine is restarted after being stopped temporarily, perform a valve opening control to move the wastegate valve to a fully open position on condition that a speed of a vehicle is less than a threshold.

7. A control method for a forced-induction device, wherein
the forced-induction device includes
- a turbine wheel arranged in an exhaust passage of an engine,
- a compressor wheel that is arranged in an intake passage of the engine and rotates integrally with the turbine wheel,
- a bypass passage that bypasses the turbine wheel, and
- a wastegate valve that selectively opens and closes a flow path of the bypass passage, and the method includes, when the engine is restarted after being stopped temporarily, performing a valve opening control to move the wastegate valve to a fully open position on condition that a speed of a vehicle is less than a threshold.

\* \* \* \* \*